United States Patent [19]

Hayakawa et al.

[11] Patent Number: 5,324,549
[45] Date of Patent: Jun. 28, 1994

[54] METHOD OF FABRICATING PHOTOCONDUCTOR COUPLED LIQUID CRYSTAL LIGHT VALVE

[75] Inventors: Takashi Hayakawa, Soraku; Shiro Narikawa, Kashihara; Katsumi Adachi, Ikoma; Akitsugu Hatano, Nara, all of Japan

[73] Assignee: Sharp Kabushiki Kaisha, Osaka, Japan

[21] Appl. No.: 992,893

[22] Filed: Dec. 18, 1992

[30] Foreign Application Priority Data

Dec. 18, 1991 [JP] Japan .................. 3-335169

[51] Int. Cl.$^5$ ............................... G02F 1/135
[52] U.S. Cl. ...................... 427/509; 427/74; 427/515; 427/574; 430/128; 430/321; 430/935; 359/47; 359/71; 359/72
[58] Field of Search ............ 427/74, 509, 515, 574; 430/128, 935, 321; 359/47, 71, 72

[56] References Cited

U.S. PATENT DOCUMENTS 4,532,199  7/1985  Ueno et al. ..................... 427/571

FOREIGN PATENT DOCUMENTS

0412843A3  8/1990  European Pat. Off. .
0422645A3  10/1990  European Pat. Off. .
57-150821  9/1982  Japan .
58-034435  2/1983  Japan .
58-199327  11/1983  Japan .
59-081627  5/1984  Japan .
63-253924  10/1988  Japan .
2-208928  8/1990  Japan .................. 427/574
3-18829  1/1991  Japan .
3-126920  5/1991  Japan .

*Primary Examiner*—Anthony Green
*Attorney, Agent, or Firm*—David G. Conlin; George W. Neuner

[57] ABSTRACT

A method for fabricating a photoconductor coupled liquid crystal valve comprising the step of; deposing a transparent electrode on a transparent substrate; forming on said transparent electrode a photoconductive layer formed of amorphous silicon by the ECR; forming on said photoconductive layer an optical shielding layer formed of amorphous silicon by the ECR; forming on said optical shielding layer an optical reflection layer; forming an orientation film on said optical reflection layer; laminating on said orientation film a transparent substrate having a transparent electrode and another orientation film stoked thereon by the above method in such a manner that the two orientation films face each other with a spacer interposed therebetween; and disposing liquid crystals into said spacer.

6 Claims, 4 Drawing Sheets

METHOD OF FABRICATING PHOTOCONDUCTOR COUPLED LIQUID CRYSTAL LIGHT VALVE

BACKGROUND OF THE INVENTION

1. Field of the Invention

The present invention relates to a method of fabricating optical devices generally referred to as photoconductor coupled liquid crystal light valves of photoaddress type liquid crystal light valves (hereinafter, referred to as photoconductor coupled liquid crystal light valves) which utilize the photoconductive effect of photoconductive layers and the electro-optical effect of liquid crystals. These photoconductor coupled liquid crystal light valves are used in image display apparatus, image processing apparatus, optical information processing systems, or the like.

2. Description of the Related Art

Recently the photoconductor coupled liquid crystal light valves utilizing the photoconductive effect of photoconductive layers and the electro-optical effect of liquid crystals have been drawing attention as optical devices to be used in image display apparatus, image processing apparatus, optical information processing systems, and the like. FIG. 6 illustrates the basic construction of a photoconductor coupled liquid crystal light valve, which as shown in the figure comprises a photoconductive layer 1, a reflection layer 5, a liquid crystal layer 2, orientation processing films 6a and 6b, two transparent electrodes 3a and 3b sandwiching them and disposed on glass substrates 7a and 7b, respectively, and an external power supply 4 which serve as a voltage applying means for applying a voltage to the transparent electrodes. Means for writing into and image-reading from the device, although not shown, are of course included therein.

The basic operating principle of this device is described below, where for simplicity the impedances of the reflection layer 5 and the orientation processing films 6a and 6b are assumed to be far lower than those of the photoconductive layer 1 and the liquid crystal layer 2.

First, an a.c. voltage $V_0$ is applied to the photoconductive layer 1 and the liquid crystal layer 2 via the transparent electrodes 3a and 3b from the external power supply 4. The voltages applied to the liquid crystal layer and the photoconductive layer in this case are at values resulting from allocating the voltage $V_0$ in proportion to the impedances of the photoconductive layer 1 and the liquid crystal layer 2. The voltage which will be applied to the liquid crystal layer 2 without incident light thereon is so set as to be adequately smaller than the threshold voltage ($V_{s1}$) at which the liquid crystal layer will yield the electro-optical effect. This means that no electro-optical effect is not produced by the liquid crystal layer 2 at the initial state.

Assume that the region to which the light is applied is $PC_1$ and that to which the light is not applied is $PC_d$. When light is applied to the photoconductive layer 1, the impedance ($Z_p$) of the region $PC_1$ of the photoconductive layer 1 greatly decreases to a value far smaller than the impedance of the liquid crystal layer 2, which implies that most of the voltage $V_0$ greater than $V_{s1}$ is applied to the liquid crystal layer 2. As a result, there develops an electro-optical effect to the liquid crystal layer 2 of the region $PC_1$. In contrast to this, the liquid crystal layer 2 of the region $PC_d$ remains having the initial voltage applied thereto, without causing the electro-optical effect. Thus, the light pattern (optical information) written into the photoconductive layer 1 has been formed on the liquid crystal layer 2.

The light pattern may be reproduced by applying reproductive light to the liquid crystal side from the light source (not shown).

According to the above-described operating principle, when the reproductive light is applied, the light that has penetrated the liquid crystal layer 2 and reached the reflection layer 5 will permeate up to the photoconductive layer 1 without being fully reflected by the reflection layer 5. This permeated light may cause the impedance of the photoconductive layer of the relevant region so as to disturb the image pattern of written light, disadvantageously.

In fact, optical reflection layers for ordinary use employ a layer provided by stacking thin layers in two types having a great difference in the induction rate to about 10 to 20 layers with a thickness of ¼ of the wavelength of the readout light. However, nonuniformities in the precision of film thickness as well as in surface orientation make it greatly difficult to attain a reflectance of 99.9% or more. For this reason, there has been a problem that the reading light may permeate into the photoconductive layer to disturb the image pattern. This problem has been remarkable especially when the amount of reading light is very large, such as when a liquid crystal light valve is used as an image display device.

As a means for solving the problem, it has been proposed that an optical shielding layer which absorbs the reproductive light is provided between the reflection layer 5 and the photoconductive layer 1 (see FIG. 6). For such an optical shielding layer previous proposals have been such that a layer in which a pigment has been mixed into an organic material is put into use as the optical shielding layer, or that as described in Japanese Patent Laid-Open Publication HEI 3-18829 between the liquid crystal layer and the photoconductive layer there is provided a metallic optical shielding layer having an island-like shape and a size of 18 μm or so for each side.

On the other hand, referring to FIGS. 5 and 6, the photoconductive layer 1 for this photoconductor coupled liquid crystal light valve has been proposed in various materials from organic to inorganic materials. For example, in Japanese Patent Laid-Open Publications SHO 57-150821, 58-34435, 58-199327, 59-81627, 63-253924, and the like it has been proposed that amorphous silicon be used as the photoconductive layer. The primary reason these proposals employ amorphous silicon is that it has a high sensitivity and a high resistance.

Moreover, in any of the proposals, this amorphous silicon is formed into films by a known fabrication method, the Plasma Chemical Vapor Deposition (hereinafter, referred to as P-CVD) or the sputtering method.

As will be understood from the operating principle of the device stated before, the impedance of the photoconductive layer without writing light incident thereon needs to be made as large as possible. This is because the impedance is required to be at least greater than that of the liquid crystal layer. The film thickness of such a photoconductive layer of the photoconductor coupled liquid crystal light valve is, for example according to the Japanese Patent Laid-Open Publication SHO 57-150821 and the like, 3 μm or more for the thickness of the amorphous silicon layer.

However, the film formation rate by the conventional P-CVD or sputtering method is no more than 10 A/sec. This results in a prolonged depositing time for a 3 μm film as long as 50 min., making the device fabrication costly.

Yet further, attaining the value of 10 A/sec. by these methods would require the RF power or gas pressure to be increased. This would accelerate reactions among plasma active seeds in vapor phase, causing $(SiH_2)_n$ powder to be generated during the excitation of the plasma. The powder would adhere onto the substrate under film formation, serving as the core for abnormal growth of amorphous silicon, which would lead to some image deficiency in the end device and therefore to less yield in the device fabrication.

As another problem, after film formation with the generation of powder involved as shown above, a large amount of the powder will remain within the vacuum layer of the plasma equipment. On this account, the inside of the vacuum layer needs to be cleaned before proceeding to the next fabrication process, requiring great amounts of labor and time.

In consequence, the fabrication methods as conventionally proposed would result in less-yield, higher-cost devices, which are far from feasible to put into practical use in terms of bulk production.

Moreover, in an attempt to take measures for providing the photoconductor coupled liquid crystal light valve employing amorphous silicon as its photoconductive layer as shown above with the aforementioned optical shielding layer that absorbs reproductive light, it is necessary to take out amorphous silicon from the vacuum equipment after its film formation and then move it to application equipment dedicated to organic material layer or separate film forming equipment dedicated to metal layer. Thus new equipment is necessitated for forming the optical shielding layer, further increasing the device fabrication cost. Also, foreign matters would adhere onto amorphous silicon when it is taken out, which may cause deficiencies in the optical shielding layer, optical reflection layer, and liquid crystal layer to be subsequently fabricated. These deficiencies would be causes for electrical short-circuit and the like which occur between the two transparent electrodes, resulting in deficiencies in liquid crystal image patterns.

When an organic material is employed as the optical shielding layer, there may arise a mechanical nonconformity due to a difference in thermal expansion coefficient from the amorphous silicon layer, which is of inorganic material. As a result, there have been some cases where peeling would occur at the interface between the amorphous silicon layer and the optical shielding layer. As a still another disadvantage, when a metal layer of island shape was employed, the size of one pixel would depend on the size of the island, thus restricting the enhancement of the resolution.

The Japanese Patent Laid-Open Publication SHO 59-81627 has disclosed one in which the optical shielding layer is given by amorphous silicon containing fluorine and hydrogen. This instance would involve use of $SiF_4$ more expensive than $SiH_4$ as the material gas, fabrication by the glow discharge method, and adjustment of the substrate temperature in preparing the optical shielding layer, thus accompanied by a difficulty in reducing the fabrication cost.

The Japanese Patent Laid-Open Publication SHO 63-253924 provides a fabrication by the P-CVD method, incapable of solving the above-described problems.

Furthermore, the inventors of the present invention have reported a method for forming a photoconductive layer made of amorphous silicon by the ECR method (The Japanese Patent Laid-Open Publication Hei 3-126920). Even in the light valve thereof, however, it was difficult to solve the aforementioned problem that the reading light may permeate into the photoconductive layer to disturb image patterns.

SUMMARY OF THE INVENTION

According to the present invention, there is provided in a method of fabricating a photoconductor coupled liquid crystal light valve providing at least a photoconductive layer, an optical shielding layer, an optical reflection layer, a liquid crystal layer, and voltage applying means for applying a voltage to these layers, the method being characterized in that the photoconductive layer and an optical shielding layer are each fabricated by the electron cyclotron resonance (hereinafter, referred to as ECR) method.

According to the present invention, the photoconductive layer and the optical shielding layer are preferably amorphous silicon semiconductors prepared by the ECR method. Preferably, these two layers are continuously formed in the same system of the ECR method.

DETAILED DESCRIPTION OF THE PREFERRED EMBODIMENTS

According to the present invention, a high film formation rate can be achieved which exceeds 200 A/sec. by fabricating an amorphous silicon for the photoconductive layer using the ECR method. Moreover, the plasma excitation within a high vacuum functions to suppress the generation of any powder, and to make it possible to suppress faulty products from being manufactured as well as eliminating the need of cleaning the equipment for ECR method. These advantages allow cost-saving photoconductor coupled liquid crystal light valves to be fabricated.

To more advantages, by using amorphous semiconductors having as its principal component silicon for both the photoconductive layer and the optical shielding layer, it becomes possible to prevent the peeling which would occur if the optical shielding layer was made from an organic material, as was proposed in the prior art, or to evade reduction in the resolution which would occur if the optical shielding layer was made from an island-shaped metal film. Further, fabricating the two layers of the photoconductive layer and the optical shielding layer both made of amorphous silicon by the same film formation equipment in a continuous manner as in the present invention would eliminate the need of taking out the device from the vacuum equipment for fabricating the optical shielding layer after the fabrication of the photoconductive layer, and at the same time prevent the adhesion of any foreign matters, allowing the yield of device fabrication enhanced with the cost reduced.

It is noted that characteristic requirements for the optical shielding layer are its capability of absorbing reproductive light (depending on both absorption coefficient and layer thickness) and its remarkable inferiority in the photoconductive characteristic resulting when the layer has absorbed the reproductive light, that is, its considerably small change in impedance when it has absorbed the reproductive light.

Figure 7:
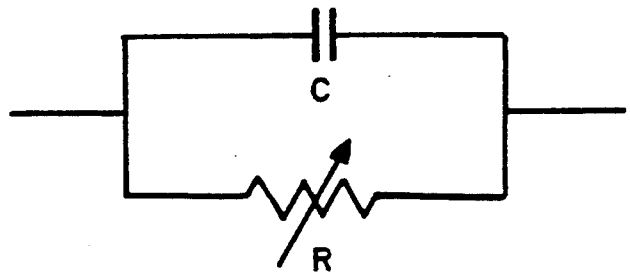
FIG. 7 is an equivalent circuit of amorphous silicon layer.

It is common practice to explain an amorphous silicon layer by a parallel circuit made up of a resistor component (R) variable in resistance depending on the turning on/off of light and a fixed capacity component (C), as shown in FIG. 7. Less change in impedance when the layer has absorbed reproductive light as described above means less change in resistance component.

The method of fabricating a liquid crystal light valve of the present invention is carried out by the following steps.

The method of fabricating a liquid crystal light value of the present invention is basically carried out by the following steps; depositing a transparent electrode on a transparent substrate; forming on said transparent electrode a photoconductive layer by ECR method; forming on said photoconductive layer an optical shielding layer by ECR method; forming an orientation film on said optical shielding layer; laminating on said orientation film a transparent substrate having a transparent electrode and another orientation film stacked thereon by the above method in such a manner that the two orientation films face each other with a space interposed therebetween; and disposing liquid crystals into said space.

Specifically, transparent electrodes are deposited on a transparent substrate. An example of the transparent substrate is a glass substrate. The transparent electrodes are exemplified by titanate oxide (ITO), tin oxide ($SnO_2$), and those formed by stacking them.

Next, a photoconductive layer is formed on the transparent electrodes by ECR method while the photoconductive layer is formed on the photoconductive layer.

These two layers comprises amorphous silicon. Each thickness of the photoconductive layer and the optical shielding layer preferably 0.1-10 $\mu$m, although actually it depends on optical absorptivity coefficients and impedances thereof.

Figure 3:
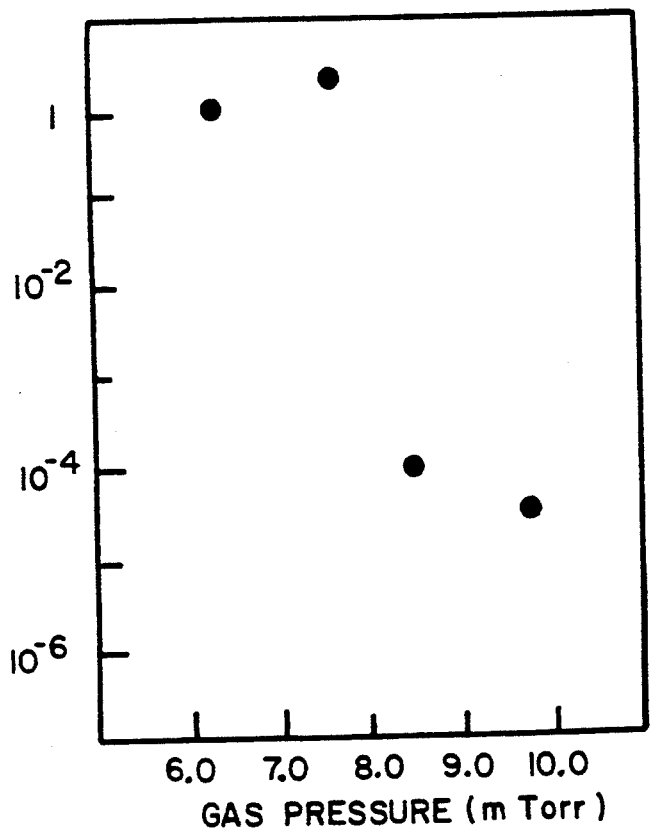
FIG. 3 is a view showing the relationship between the degree of photoconductance and gas pressure in the embodiment.

According to ECR method, as shown in FIG. 3, the resistance resulting when the light has been absorbed can be made smaller by lowering the gas pressure in the fabrication of the amorphous silicon with the substrate temperature kept unchanged, therby increasing the change in the impedance. On the hand, the resistance resulting when the light has been absorbed can be made larger by heightening the gas pressure, thereby decreasing the change in the impedance. In other words, the ECR method makes it possible to provide an optical shielding layer with amorphous silicon to be fabricated at a low gas pressure and immediately thereafter control the gas pressure to a high value enough to fabricate an optical shielding layer. In addition, the film formation rate on the film formation conditions of the present embodiment, which will be described later, is an remarkably high value as much as 1.0 to 1.5 $\mu$m/min.

The advantages offered in fabricating the device of the invention utilizing ECR method are as follows.

(1) The film formation rate is a high value more than ten times that by the normal P-CVD method or the sputtering method. The material gas utilization efficiency is also high. Thus, the cost for fabricating the device can be suppressed low.

(2) Film is formed at a low gas pressure so that any polymers such as $(SiH_2)_n$ can be prevented from being generated while the plasma is being excited, and that the amorphous silicon can be suppressed from abnormally growing. Thus, the yield for device fabrication can be enhanced.

(3) Control of the gas pressure allows the fabrication of the photoconductive layer and the optical shielding layer; therefore, continuously fabricating both layers in combination of advantage (1) makes it possible to shorten the time for device fabrication and reduce the cost therefore.

In this way, the fabrication by ECR method offers the possible maximal advantages of the present invention.

Naturally, even if only one of the photoconductive layer and the optical shielding layer is fabricated by ECR method and the other is by the P-CVD or sputtering method, the prior art problems related to the optical shielding layer can be solved, whereas it becomes difficult to continuously form the films by the same equipment.

Figure 1:
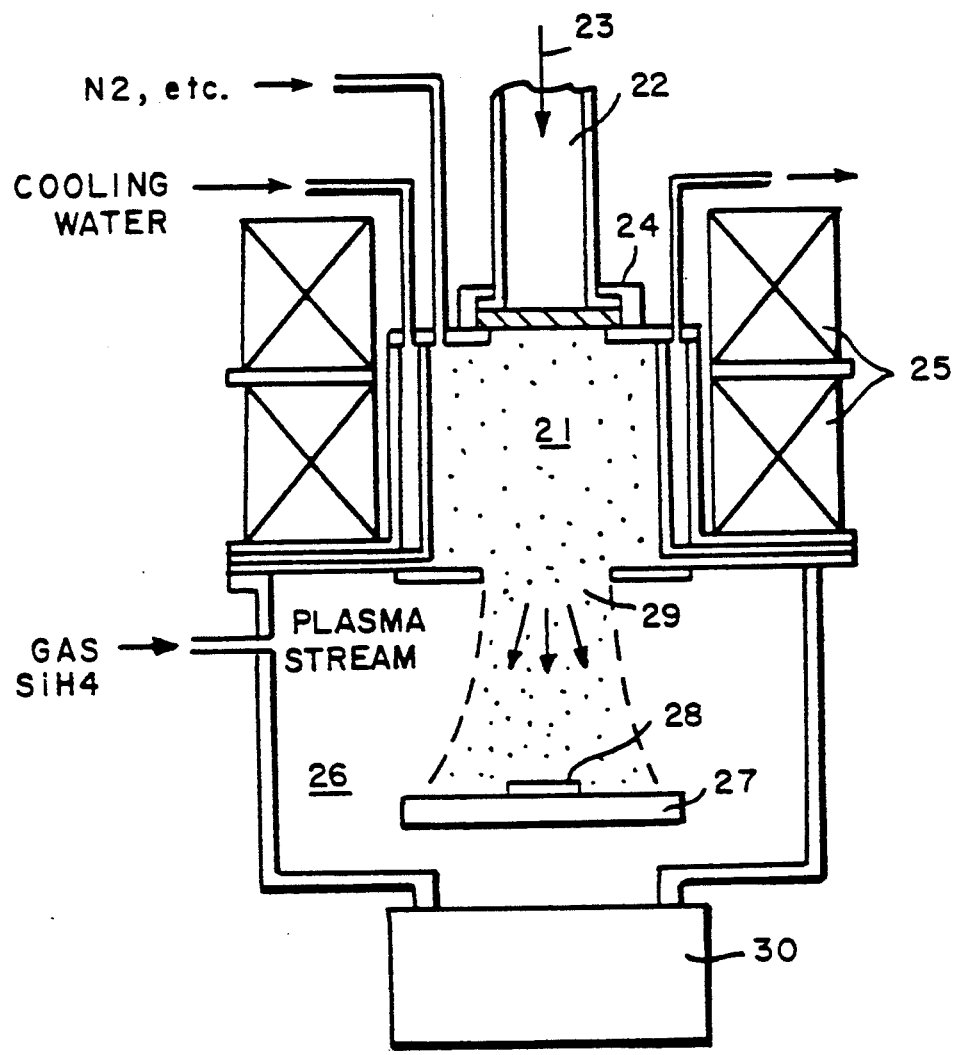
FIG. 1 is an arrangement explanatory view illustrating the film formation equipment used in the present invention.

An example of the film formation equipment for ECR method available in the present invention is a system as shown in FIG. 1. The film formation system shown in FIG. 1 has a plasma chamber 21 of cavity resonator structure, and a waveguide 22 that allows a microwave 23 to be introduced into the system. It is noted that microwave guide window 24 is made of quartz glass through which a microwave can penetrate. The plasma chamber will have Ar or $H_2$ gas introduced therein as required. Installed around the plasma chamber 21 are magnetic coils 25, where divergent magnetic fields are applied to draw out plasma that has been developed. A substrate 27 is provided in a deposition chamber 26. The deposition chamber is so arranged that silicon compounds containing H or halogen such as $SiH_4$, $Si_2H_6$, $SiF_4$, $SiCl_4$, $SiHCl_3$, and $SiH_2Cl_2$ as the material gas can be introduced singly or in the form of mixtures thereof.

The plasma chamber 21 and the deposition chamber 26 are first exhausted, and Ar, $H_2$, and the material gas are introduced into each chamber. The gas pressure is set to $10^{-3}$ Torr to $10^{-4}$ Torr. At this point, a microwave 23 with a frequency of 2.45 $GH_z$ is introduced into the plasma chamber 21 and meanwhile a magnetic field gradually dissipating toward the substrate is applied thereto to excite plasma. The dissipating magnetic field exhibits a magnetic flux density of 875 Gauss or more at some portion thereof. The Ar, $H_2$, and material gas formed into plasma are led to the substrate 27, where amorphous silicon 28 deposits on the substrate. Further, the film uniformity can be enhanced by controlling the position and size of a plasma drawing window 29. Reference numeral 30 denotes a vacuum system.

With such a film formation system as described above, and using SiH$_4$ gas as the material gas, film formation experiments were conducted by changing the gas pressure. In addition, Table 1 shows condition of the film formation.

TABLE 1

| SiH4 amount (sccm) | Ar amount (sccm) | Gas pressure (mTorr) | Microwave power (kW) | Substrate temperature (°C.) |
|---|---|---|---|---|
| 120 | 20 | 6.0-10.0 | 2.5 | No heated |

Figure 2:
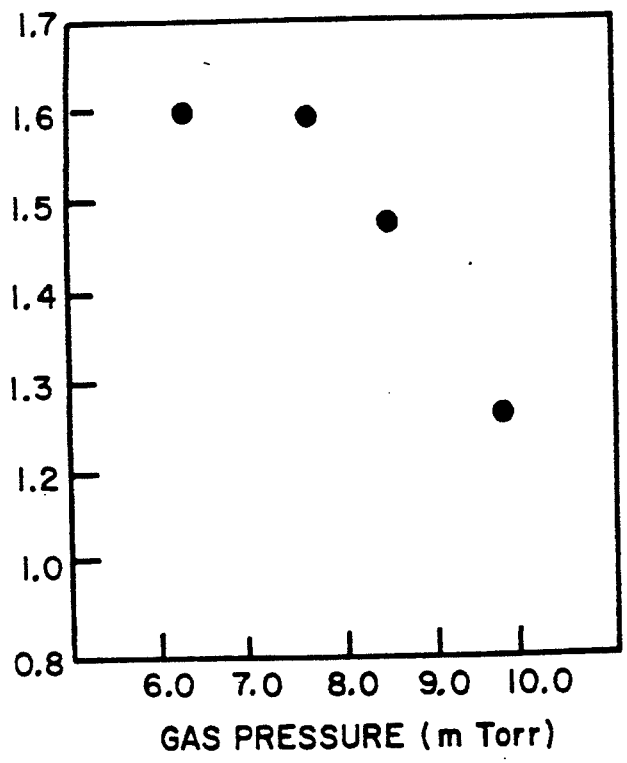
FIG. 2 is a view showing the relationship between film formation rate and gas pressure in an embodiment of the invention.

Of this amorphous silicon film, the film formation rate and the gas pressure dependency of photoconductive characteristic are shown in FIG. 2 and FIG. 3, respectively. The substrate was not heated in this case.

As seen from the figures, it is possible by the ECR method to change the characteristics of amorphous silicon to be formed into a film by controlling the gas pressure during the film formation. In particular, the film formation rate can be increased as high as 1.5 μm/min. at a low gas pressure, while a superior photoconductive property can be obtained.

Yet, no (SiH$_2$)$_n$ powder is developed, the amorphous silicon is prevented from abnormally growing, and there was no need for cleaning the inside of the vacuum layer.

In addition, the optical band gap of the photoconductive layer fabricated in the above-described way showed somewhat high values of 1.80 to 2.05 eV.

Next, the introduction of the microwave is once stopped, dissipating the plasma. Then an amorphous silicon film is similarly formed by the above method for fabricating the optical conductive layer except that the substrate in heated to 150°-300° C. Doing film formation under these conditions will allow the optical band gap to be diminished. As a result, it is possible to fabricate an optical shielding layer having an adequate absorption ability with respect to a semiconductor laser having an oscillation wavelength of 670 nm.

Subsequently, an optical reflection layer is formed by stacking TiO$_2$-SiO$_2$, MgF-ZnS, Si-SiO$_2$, and the like onto the optical shielding layer obtained alternately up to 10 to 15 layers by the electron beam deposition (EB method) or the like. The thickness of the optical reflection layer is generally 0.5 to 5 μm. On this optical reflection layer, a polyimide film or other film is formed by the spin coat method, and it is subjected to rubbing for orientation, thereby forming an orientation film.

Subsequently formed is another transparent substrate on which a transparent electrode and an orientation film are stacked by the above method. The two transparent substrates are laminated to each other in such a manner that the two orientation films face each other with a spacer interposed therebetween followed by disposing liquid crystals in the spacer. Thus the photoconductor coupled liquid crystal light value of the present invention can be obtained.

Liquid crystals available include nematic liquid crystals, ferroelectric liquid crystals, and smectic A liquid crystals having the electro-clinic effect. As the operating mode there are available hybrid electric field effect mode, twisted nematic mode, electric field effect birefringence mode, and the like.

On the outside of the transparent substrate of the above photoconductor coupled liquid crystal light valve, that is, on the incident side of reproductive light there may be deposited a reflection preventive film as required to prevent the reflection of incident light.

Now examples of the present invention are described below in which amorphous silicon films fabricated by the above ECR method are employed as the photoconductive layer of the photoconductor coupled liquid crystal light valve.

EXAMPLE 1

Figure 4:
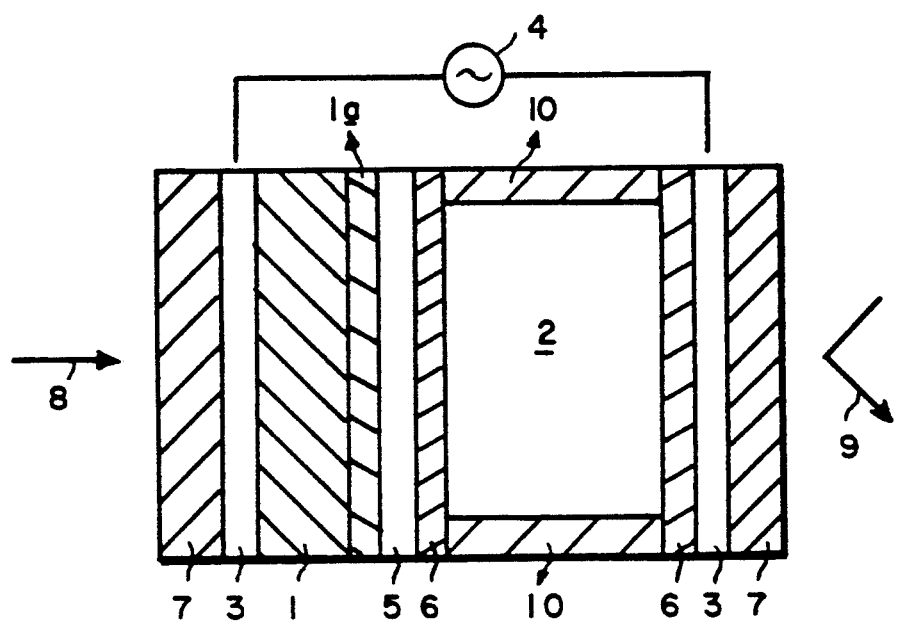
FIG. 4 is an arrangement explanatory view illustrating the embodiment of the photoconductor coupled liquid crystal light valve according to the present invention.
Figure 5:
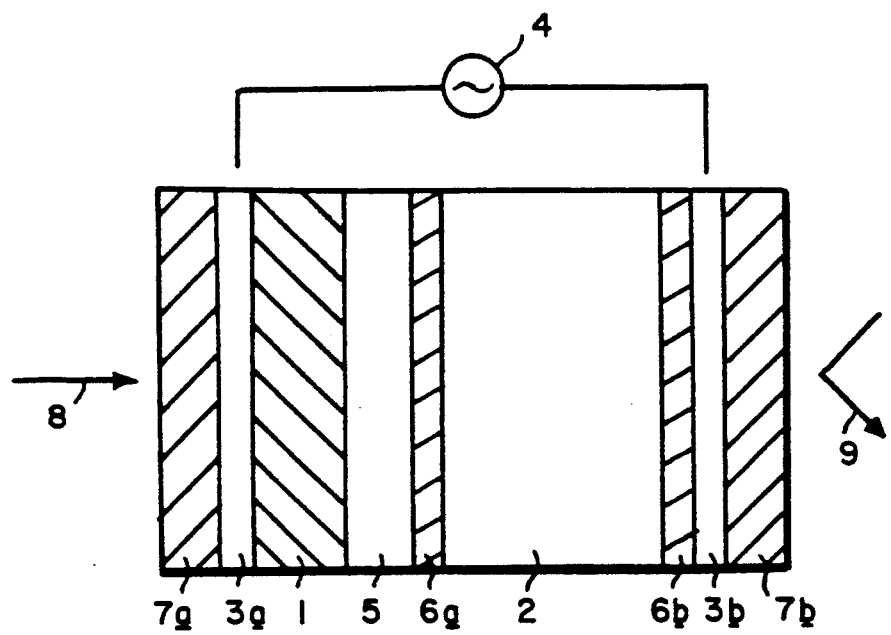
FIG. 5 is an arrangement explanatory view illustrating a conventional photoconductor coupled liquid crystal light valve.
Figure 6:
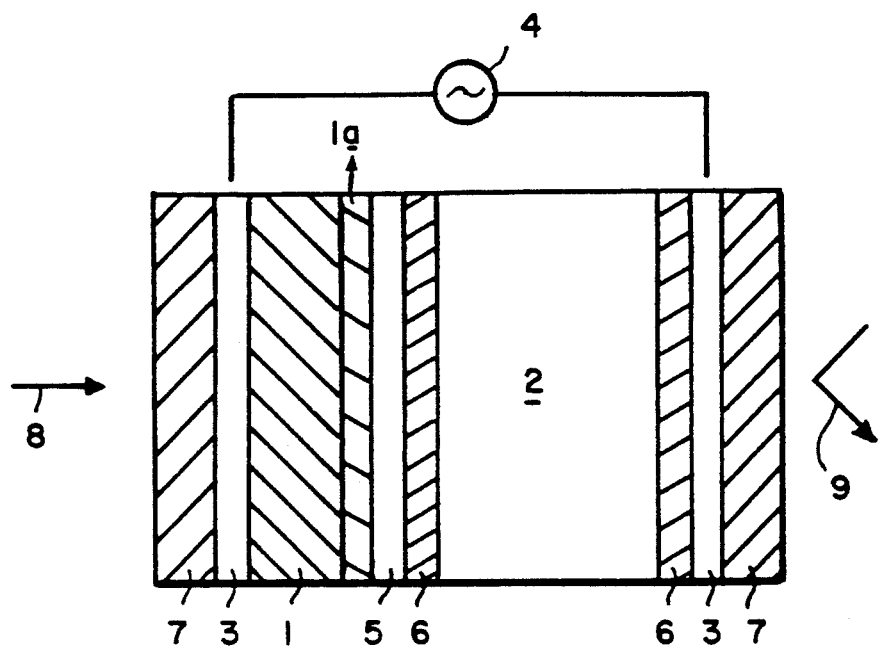
FIG. 6 is an arrangement explanatory view illustrating a conventional photoconductor coupled liquid crystal light valve.

Referring to FIG. 4, on a glass substrate 7, which was a transparent substrate, there were formed transparent electrodes 3 composed of ITO and SnO$_2$ at a film thickness of 0.07 μm by sputtering. Needles to say, a glass substrate on which these transparent electrodes have previously formed may be used.

Then the glass substrate having the electrodes formed thereon was placed in the ECR system as shown in FIG. 1, and after evacuating the interior of the system to the order of $10^{-7}$ Torr, an photoconductive layer 1 was fabricated which was composed of amorphous silicon on the conditions as shown in Table 2. The photoconductive layer prepared was 7 μm.

TABLE 2

| SiH4 amount (sccm) | Ar amount (sccm) | Gas pressure (mTorr) | Microwave power (kW) | Substrate temperature (°C.) |
|---|---|---|---|---|
| 120 | 20 | 6.5 | 2.5 | No heated |

After fabricating the photoconductive layer, the microwave was once stopped, dissipating the plasma, and immediately after controlling the gas pressure, the microwave was introduced again. Then plasma was excited on the conditions as shown in Table 3, fabricating an optical shielding layer 1a. The thickness of the optical shielding layer prepared was 2 μm.

TABLE 3

| SiH4 amount (sccm) | Ar amount (sccm) | Gas pressure (mTorr) | Microwave power (kW) | Substrate temperature (°C.) |
|---|---|---|---|---|
| 120 | 20 | 9.0 | 2.5 | No heated |

On the optical shielding layer, there was formed an optical reflection layer 5 (dielectric mirror layer) by alternately stacking SiO$_2$/TiO$_2$ thin film layers at a layer thickness of 0.07 μm by the EB deposition. This optical reflection layer 5 was so constructed that SiO$_2$/TiO$_2$ thin film layers were stacked alternately. Further on the optical reflection layer, a polyimide film was formed by the spin coat method, and an orientation film 6 which had been molecule-oriented was stacked thereon.

Then another piece of glass substrate 7 on which similar orientation films/transparent electrode layers had previously been stacked was laminated with the glass substrate 7 having the layers, with two spacers interposed therebetween so that the spacing across which the two opposing orientation films 6 would become approximately 6 μm, where liquid crystals are injected into the 6 μm space and sealed. The arrangement view of the liquid crystal light valve in this case is shown in FIG. 4. Liquid crystals used were phenyl cyclohexane base nematic liquid crystals, while the operating mode was the hybrid electric field effect mode.

The voltage in writing of the liquid crystal light valve fabricated in this way would be applied from both transparent electrodes. Simultaneously with this, by applying writing light 8, a write image is formed in a liquid crystal layer 2.

Reproducing the image could be done by irradiating reproductive light 9 that has passed through the polarizing plate, from the side of the liquid crystal layer 2, and by making the reflection light further pass through the polarizing plate. The liquid crystal light valve of the present embodiment was usable, without any difficulties, even when the reproductive light was of such a great quantity of light as would disturb any written image of the conventional liquid crystal light valve having no optical shielding layer. In this embodiment, the gas pressure in fabricating the optical shielding layer was set to 9.0 mTorr from the results as shown in FIG. 3; however, it can be easily expected that further increased gas pressure will be even more effective.

What is claimed is:

1. A method of fabricating a photoconductor coupled liquid crystal light valve, said method comprising: providing a liquid crystal light valve comprising at least a photoconductive layer, an optical shielding layer, an optical reflection layer, a liquid crystal layer, and voltage applying means for applying a voltage to these layers, wherein the method includes fabricating the photoconductive layer and the optical shielding layer sequentially in a single apparatus using the electron cyclotron resonance method.

2. A method of fabricating a photoconductor coupled liquid crystal light valve as set forth in claim 1, wherein the method comprises fabricating the photoconductive layer and the optical shielding layer, each having as their principal component silicon, by using a material gas composed of a silane compound.

3. A method of fabricating a photoconductor coupled liquid crystal light valve as set forth in claim 2, wherein the material gas composed of a silane compound is selected from $SiH_4$, $Si_2H_6$, $SiCl_4$, $SiHCl_3$ and $SiH_2Cl_2$.

4. A method of fabricating a photoconductor coupled liquid crystal light valve as set forth in claim 1, wherein the optical shielding layer is manufactured under conditions defined as a microwave power of 2.5 KW, a gas pressure of 6.0 to 10.0 mTorr and the substrate temperature is at 150° to 300° C.

5. A method of fabricating a photoconductor coupled liquid crystal light valve as set forth in claim 1, wherein the optical shielding layer is manufactured under conditions defined as a microwave power of 2.5 KW, a gas pressure of 6.0 to 10.0 mTorr and the substrate is not heated.

6. A method of fabricating a photoconductor coupled liquid crystal light valve as set forth in claim 1, wherein the optical band gap of the photoconductive layer is 1.80 to 2.05.

* * * * *